(12) United States Patent
Liu et al.

(10) Patent No.: US 7,414,565 B2
(45) Date of Patent: Aug. 19, 2008

(54) EFFICIENT APPROACH FOR REDUCING IMAGE TRANSFER TIME IN WIRELESS PORTABLE X-RAY DETECTORS

(75) Inventors: James Zhengshe Liu, Glenview, IL (US); John Robert Lamberty, Oconomowoc, WI (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 11/268,233

(22) Filed: Nov. 7, 2005

(65) Prior Publication Data

US 2007/0102643 A1 May 10, 2007

(51) Int. Cl.
*H03M 1/58* (2006.01)
(52) U.S. Cl. ...................... 341/169; 341/155
(58) Field of Classification Search ................. 341/155, 341/169, 170
See application file for complete search history.

(56) References Cited

U.S. PATENT DOCUMENTS

| | | | | |
|---|---|---|---|---|
| 5,920,274 A | * | 7/1999 | Gowda et al. ............... 341/155 |
| 6,100,828 A | * | 8/2000 | Sparks ....................... 341/120 |
| 6,205,199 B1 | * | 3/2001 | Polichar et al. ............ 378/98.8 |
| 6,545,624 B2 | * | 4/2003 | Lee et al. ..................... 341/155 |
| 6,987,536 B2 | * | 1/2006 | Olding et al. ............... 348/297 |
| 7,053,806 B1 | * | 5/2006 | Rao et al. ................... 341/120 |
| 2005/0254706 A1 | * | 11/2005 | Bailey et al. ................ 382/166 |
| 2006/0028686 A1 | * | 2/2006 | Bergman et al. ............ 358/2.1 |

* cited by examiner

*Primary Examiner*—Howard Williams
(74) *Attorney, Agent, or Firm*—McAndrews, Held & Malloy, Ltd.; Peter J. Vogel; Michael A. Dellapenna

(57) ABSTRACT

Certain embodiments of the present invention provide for an imaging system including an index value source, a transmitter, a receiver, and an image processing component. The index value source is capable of generating an index value. The index value source is part of and/or included in an imaging system detector. The transmitter is in communication with the index value source. The receiver is in communication with the transmitter. The image processing component is in communication with the receiver. The image processing component includes a lookup table. The image processing component is capable of generating a pixel value based at least in part on an index value and a lookup table. The pixel value has a bit-width greater than the index value. In an embodiment, the receiver is in wireless communication with the transmitter.

12 Claims, 6 Drawing Sheets

EFFICIENT APPROACH FOR REDUCING IMAGE TRANSFER TIME IN WIRELESS PORTABLE X-RAY DETECTORS

BACKGROUND OF THE INVENTION

The present invention generally relates to image transfer in digital imaging systems. In particular, the present invention relates to an efficient approach for reducing image transfer time in wireless portable x-ray detectors.

Digital imaging systems may be used to capture images to assist a physician in making an accurate diagnosis. Digital imaging systems typically include a source and a detector. Energy, such as x-rays, produced by the source travel through an object to be imaged and are detected by the detector. An associated control or image processing system obtains image data from the detector and prepares a corresponding diagnostic image on a display.

The detector may be an amorphous silicon flat panel detector, for example. Amorphous silicon is a type of silicon that is not crystalline in structure. Image pixels are formed from amorphous silicon photodiodes connected to switches on the flat panel. A scintillator is placed in front of the flat panel detector. For example, the scintillator receives x-rays from an x-ray source and emits light of an intensity related to the amount of x-rays absorbed. The light activates the photodiodes in the amorphous silicon flat panel detector. Readout electronics provide pixel data or values from signals from the photodiodes through data lines (columns) and scan lines (rows), for example. Images may be formed from the pixel data. Images may be displayed in real time. Flat panel detectors may offer more detailed images than image intensifiers. Flat panel detectors may allow faster image acquisition than image intensifiers depending upon image resolution.

A solid state flat panel detector typically includes an array of picture elements (pixels) composed of Field Effect Transistors (FETs) and photodiodes. The FETs serve as switches, and the photodiodes are light detectors and image storage elements. The array of FETs and photodiodes may be composed of amorphous silicon. A compound such as Cesium Iodide (CsI) is deposited over the amorphous silicon. CsI absorbs x-rays and converts the x-rays to light. The light is then detected and stored by the photodiodes. The photodiode acts as a capacitor and stores the charge.

Initialization of the detector occurs prior to an exposure. During an initialization of the detector, the detector is "scrubbed" prior to an exposure. During scrubbing, each photodiode is charged to a known bias voltage that represents "black", or no light output. The detector is then exposed to x-rays which are absorbed by the CsI deposited on the detector. Light that is emitted by the CsI in proportion to x-ray flux causes the affected photodiodes to conduct, partially discharging the photodiode.

After the conclusion of the x-ray exposure, the voltage on each photodiode may be gated through a FET switch to readout electronics that may include, for example, an analog voltage comparator, which compares the photodiode's stored voltage with a voltage generated from a digital to analog (D/A) converter. The digital input to the D/A converter may begin at '0', for example, and is incremented through a programmable ramp to a maximum value. As the analog ramp increases on the output of the D/A converter, the output eventually equals or exceeds the voltage coming from the photodiode, at which time the analog voltage comparator latches the current value of the D/A converter, which may represent, for example, the digital pixel value for that photodiode. As another example, the comparator may output the value of input to the D/A converter. This input may be, for example, an index value for the programmable ramp. That is, the programmable ramp may be generated based at least in part on an index value provided as an input to the D/A converter.

The readout electronics may then use a lookup table (or other data structure) to translate the output of the comparator (e.g., the index value) to a pixel value. Because it is desirable for the conversion of the signal from the detector element to a digital pixel value to occur as quickly as possible, the total number of index values input to the D/A converter may be much less than the range of the ramp values. As an example, the index value may range from, for example, 1-1800, while the corresponding ramp values may range from 1-16,000. To convert the index value output by the comparator to a pixel value, which may be, for example, the ramp value, the lookup table may contain entries for each index value (e.g., 1-1800) mapping each to a corresponding ramp value (e.g., 1-16,000). Although the ramp value latched may not exactly equal (i.e., as mentioned, it may exceed) the detector element's signal, this method allows for a much faster conversion from the analog detector signal to the digital value. Thus, the energy detected by the detector element is converted from an analog voltage to a digital pixel value.

In any imaging system, x-ray or otherwise, image quality is important. In this regard, x-ray imaging systems that use digital or solid state image detectors experience certain electrical phenomena that may cause imaging difficulties. Difficulties in a digital x-ray image may include image artifacts, "ghost images," or distortions in the digital x-ray image. Imaging difficulties may be caused by effects such as electronic current leakage from imaging system circuitry, x-ray detector, and the like. During x-ray system calibration, a "dark" image may be acquired to adjust the image intensity offset. A "dark" image is a reading taken of the image intensifier, CCD, flat panel detector, and the like, without x-ray exposure. For example, a "dark" image may be acquired from a flat panel detector when no x-rays are being emitted from the source. By way of example, one electrical phenomena is that, over time, electronic circuits experience drift in their baseline response and changes in their gain response. Changes in baseline response and gain cause an "offset" or change in the electrical response of the detector for the signal produced based on a given x-ray count. For example, a new detector may produce a 5 volt signal when an x-ray count of 5000 RADs is detected. However, as time passes, the baseline response may increase 5 volts and thus the detector may produce a 10 volt signal when the same 5000 RAD count is detected. A "dark" image may determine the offset produced by the detector and x-ray system since it will capture the baseline shift. By subtracting the "dark" image pixel values from the actual "exposed" x-ray image pixel values of a desired object (i.e., the "light" image), the offset effects may theoretically be eliminated. Conventional systems may acquire offset readings in between x-ray imaging exposures. That is, a "dark" image and a "light" image may be acquired as pairs. During, for example, system calibration, sequences of "dark" images may be acquired without intervening "light" images.

Additionally, many imaging products are mobile, which offers hospitals, clinics, and physicians the ability to move these systems from room-to-room or to bring x-ray capability to a patient that cannot be moved. However, a portable imaging system may require one or more wires or cables from, for example, the detector to a control or image processing component of the system. These wires may encumber placement or movement of the system. As another example, the length of the wire may limit where the portable system may be used. As another example, the wires may become tangled up with the portable components and/or their operators.

These problems with cables may be resolved, in part, by using wireless communication in the imaging system. For example, wireless communication may be used between the detector and the host processing component. However, a major challenge with a wireless detector is image transfer speed. Because wireless communications generally have significantly slower transfer speeds than wired communications, transferring an image may require an unacceptable amount of time. For example, for a "light" image that is 2048 pixels by 2048 pixels, with each pixel being represented by a 16 bit value, 64 Megabits (Mb) must be transferred for the image alone, not including any communications overhead. A wired system may have a bandwidth of 100 Mb/s, for example. Therefore, roughly 0.64 seconds would be required to transfer the image (again, not taking into account communication overhead). For a wireless system with a bandwidth of, for example, 11 Mb/s, almost 6 seconds would be required for the transfer. This much greater transfer time may be unacceptable to users of the system. Further, as mentioned, this transfer time does not account for communications overhead which may be, for example, 30%, increasing the transfer time even more. Thus, it is highly desirable to reduce image transfer time in wireless portable detectors.

Therefore, there is a need for an efficient approach for reducing image transfer time in wireless portable x-ray detectors.

BRIEF SUMMARY OF THE INVENTION

Certain embodiments of the present invention provide for an imaging system including an index value source, a transmitter, a receiver, and an image processing component. The index value source is capable of generating an index value. The index value source is part of and/or included in an imaging system detector. The transmitter is in communication with the index value source. The receiver is in communication with the transmitter. The image processing component is in communication with the receiver. The image processing component includes a lookup table. The image processing component is capable of generating a pixel value based at least in part on an index value and a lookup table. The pixel value has a bit-width greater than the index value. In an embodiment, the index value source is an analog-to-digital converter. In an embodiment, the index value source generates an index value using a ramp. In an embodiment, the receiver is in wireless communication with the transmitter. In an embodiment, the image processing component receives an index value generated by the index value source.

Certain embodiments of the present invention provide for a system for reducing image transfer time including a receiver and a translation mechanism. The receiver is capable of receiving an index signal from a detector. The receiver is utilized by an image processing component. The translation mechanism is in communication with the receiver. The translation mechanism is utilized by the image processing component. The translation mechanism is part of and/or included in the image processing component. The translation mechanism is capable of producing a pixel value based at least in part on an index signal. In an embodiment, receiver is capable of wirelessly receiving an index signal from a detector. In an embodiment, the translation mechanism includes a lookup table. In an embodiment, the translation mechanism generates the pixel value based at least in part on the index signal and the lookup table. In an embodiment, the lookup table includes a mapping between an index signal and a pixel value.

In an embodiment, the translation mechanism includes an equation. In an embodiment, the index signal is based at least in part on a detector signal. In an embodiment, the index signal is based at least in part on comparing the detector signal to a ramp.

Certain embodiments of the present invention provide for a method for reducing image transfer time in an imaging system including receiving a detector signal from a detector element, converting the detector signal to an index value at an imaging system detector, communicating the index value to an image processing component, and translating the index value to a pixel value at the image processing component. The detector element is used by the imaging system detector. In an embodiment, the communication step utilizes wireless communication. In an embodiment, the conversion step is performed at least in part by an analog-to-digital converter. In an embodiment, the conversion step is based at least in part on a ramp. In an embodiment, the translating step is based at least in part on a lookup table. In an embodiment, the translating step is based at least in part on an equation. In an embodiment, the pixel value has a bit-width greater than the index value.

Figure 1:
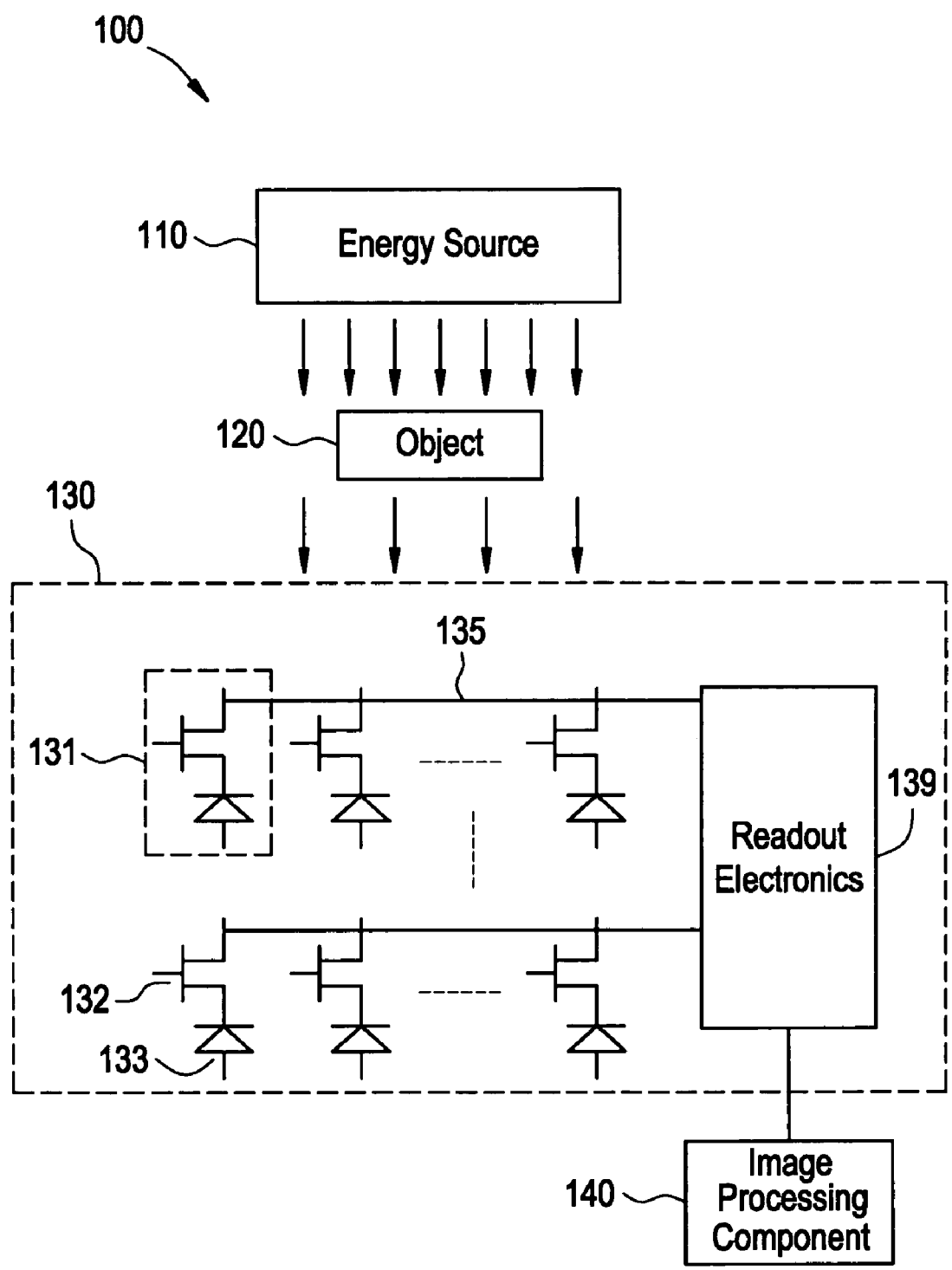
FIG. 1 illustrates an imaging system used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an imaging system 100 used in accordance with an embodiment of the present invention. For the purposes of illustration, the imaging system 100 is described as an x-ray system. The system 100 includes an energy source 110, an object to be imaged 120, a detector 130, and an image processing component 140. The energy source 110 may be an x-ray energy source, for example. The object 120 may be a patient or a calibration tool, for example. The detector 130 may be an amorphous silicon flat panel x-ray detector, for example. The image processing component 140 is in communication with the detector 130. The components of the imaging system 100 may be implemented in hardware, software, and/or firmware, for example. The components of the imaging system 100 may be implemented separately and/or combined in various forms, for example.

The detector 130 includes cells or detector elements 131 connected by data lines 135 to readout electronics 139. In certain embodiments, the detector elements 131 include photodiodes 133 connected to switches 132. The switches 132 may be Field Effect Transistor (FET) switches, for example.

In operation, the object 120 is positioned between the source 110 and the detector 130. The energy source 110 generates x-rays, for example. The x-rays pass through the object 120. Some of the x-rays may be absorbed by the object 120. The remaining x-rays strike the detector 130. The detector 130 may include a scintillator (not shown). The scintillator emits light in response to x-rays which strike it. The emitted light may then be detected by the photodiodes 133, for example. Light emitted by the scintillator activates the photodiodes 133 in the detector 130. When light strikes the photodiodes 133, the photodiodes 133 may discharge in proportion to the light (and thus the x-ray) exposure. When the switches 132 are closed, the photodiodes 133 recharge, and a measure of the light (and thus the x-ray) exposure may be obtained via the data lines 135 and readout electronics 139.

The readout electronics 139, as will be described in more detail below, receive a signal from a detector element 131 and convert it to a digital value. This digital value may represent, for example, the x-ray exposure at the detector element 131. In current systems, the digital value is a pixel value in a digital image. In an embodiment of the present invention, the digital value is an index value. In an embodiment, at the image processing component 140 the index value is translated to a pixel value to be used, for example, in constructing a digital image.

The readout electronics 139 may communicate data from the detector 130 to the image processing component 140. The data may be an index value, for example. The data may be utilized to construct an image at the image processing component 140. The image processing component 140 may display the image. The image processing component 140 may run one or more image processing algorithms on the image. For example, the image processing component 140 may run a metal artifact reduction algorithm on the image. Alternatively, the image processing component 140 may store the image for later processing and/or review.

As discussed above, "dark" images may be acquired as part of normal operation of the imaging system 100 and/or as part of calibration. A "dark" image may be used to counteract, for example, offset effects from the electronics of the imaging system 100 that result in reduced image quality. When acquiring a "dark" image, an object 120 may not be positioned in the imaging system 100.

As discussed above, sequences of images may be acquired. For example, pairs of "light" and "dark" images may be acquired, for example, as part of the normal operation of the imaging system 100. As another example, a sequence of one or more "dark" images may be acquired, for example, for use in calibration of the imaging system 100.

In an embodiment, the pixel value has a bit-width greater than the bit-width of the index value. For example, the index value may be represented by 11-bits. The 11-bits may represent the index value as an integer, for example. The pixel value may be represented by a 16-bit value. The pixel value may represent a grayscale level or RGB color value for a given pixel in a digital image, for example.

By communicating the index value to the image processing component 140 rather than a pixel value (as is done in current systems), a significant reduction may be made in the amount of data that must be transferred. The reduction in data to be transferred corresponds to a savings in the time necessary to communicate the data. For example, for a "light" image that is 2048 pixels by 2048 pixels, with each pixel being represented by a 16-bit pixel value, 64 Mb must be transferred for the image. However, an embodiment of the present invention which transfers only the index value (e.g., 11-bits) for each pixel, only 44 Mb must be transferred. As another example, for a "dark" image, current systems similarly require 64 Mb to be transferred for the image. However, an embodiment of the present invention which transfers only the index value (e.g., 9-bits) for each pixel, only 36 Mb must be transferred. Thus, for a pair of "light" and "dark" images to be transferred, current systems must transfer 128 Mb, whereas certain embodiments of the present invention require only 80 Mb to be transferred. This results in a savings of 37.5%. This savings in data to be transferred corresponds to a similar reduction in the time to transfer as well. For sequences of "dark" images, the savings are even more dramatic. Where current systems must transfer 64 Mb per "dark" image, certain embodiments of the present invention require only 36 Mb per image. Thus, the savings in both amount of data and time approach 43.75% for longer sequences of "dark" images. Certain embodiments of the present invention achieve these savings without the need for any compression and without the loss of any quality in the finally compiled digital image.

Figure 2:
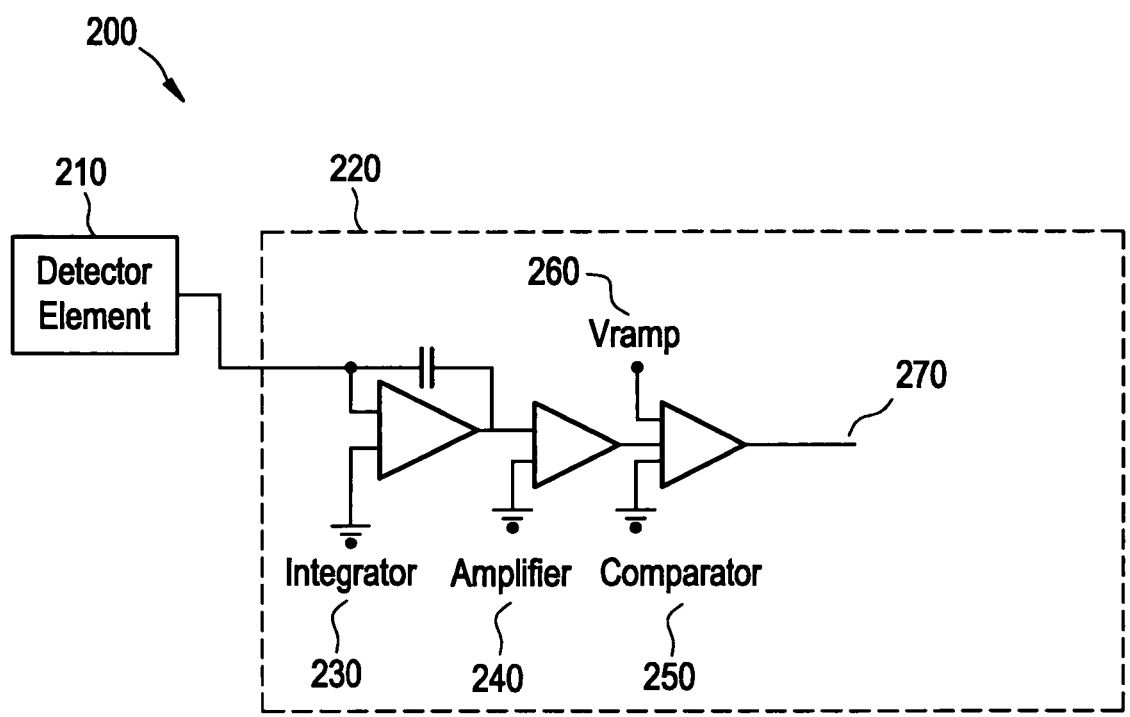
FIG. 2 illustrates a block diagram of an imaging system detector used in accordance with an embodiment of the present invention.

FIG. 2 illustrates a block diagram of an imaging system detector 200 used in accordance with an embodiment of the present invention. The detector 200 may be similar to the detector 130, described above. The detector 200 includes a detector element 210 and readout electronics 220. The detector element 210 may be similar to the detector element 131, described above. The readout electronics 220 may be similar to the readout electronics 139, described above. The readout electronics 220 are in communication with the detector element 210. The components of the imaging system detector 200 may be implemented in hardware, software, and/or firmware, for example. The components of the imaging system detector 200 may be implemented separately and/or combined in various forms, for example.

The readout electronics 220 may include an integrator stage 230, an amplifier stage 240, and/or a comparator stage 250. The integrator stage 230 is in communication with the detector element 210. The amplifier stage 240 is in communication with the integrator stage 230. The comparator stage 250 is in communication with the amplifier stage 240. The comparator stage 250 receives a reference signal 260 (Vramp). The comparator stage 250 generates a comparator output 270.

In operation, to read the detector signal from the detector element 210, the integrator stage 230 measures the integration of the current being charged to the detector element 210. The amplifier stage 240, if present, may then amplify the output of the integrator stage 230. The comparator stage 250 takes output of the amplifier stage 240 and compares it to a reference signal 260.

Figure 3:
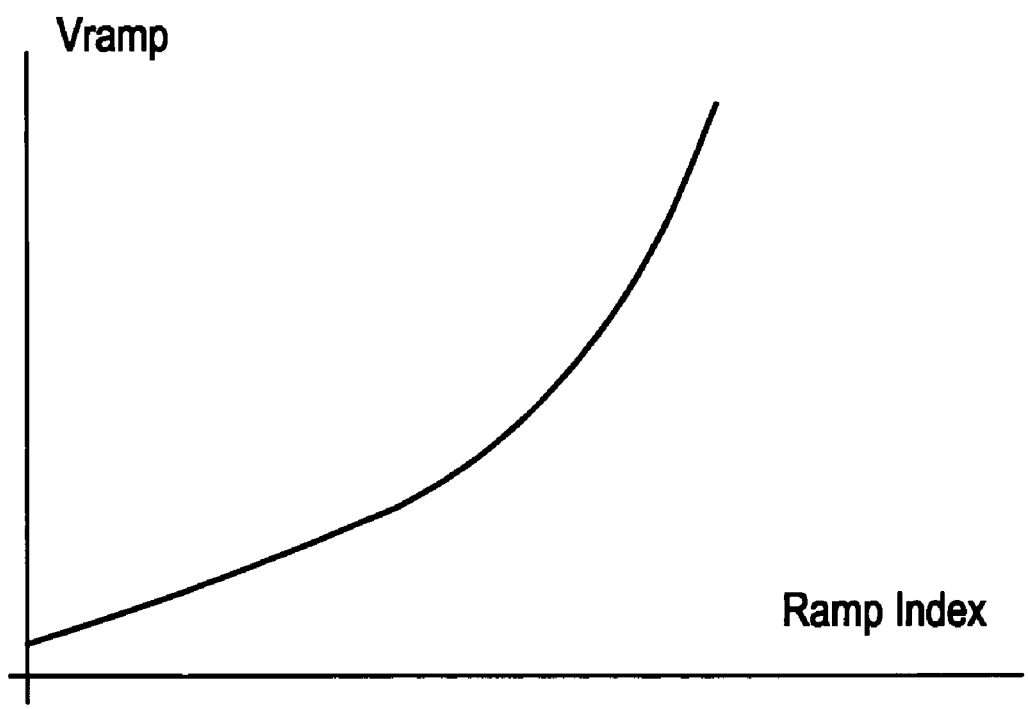
FIG. 3 illustrates a ramp used in accordance with an embodiment of the present invention.

The reference signal 260 may be generated from a programmable ramp, as described above. The reference signal 260 may be generated from an equation. The reference signal 260 may be generated using a digital-to-analog converter, for example. For example, as described above, a digital-to-analog converter may take as an input an index value, where the index value corresponds to an index level of a programmable ramp. The digital-to-analog converter may then output a ramp value (i.e., reference signal 260) based at least in part on the index value. The programmable ramp may be, for example, a linear-quadratic ramp. FIG. 3 illustrates a ramp 300 used in accordance with an embodiment of the present invention. For some portion of the ramp 300, a ramp index value results in a linear ramp value. For other portions of the ramp 300, a ramp index value results in a quadratic ramp value. For example, the ramp 300 may output a linearly-changing, small ramp value for corresponding small index values, and for larger index values, the ramp 300 may output a quadratically-changing larger ramp value. For example, to set a conversion proportional to quantum noise, the equation DAvalue=k(Index$^n$) may be used.

As described above, the index values may have a smaller range than the corresponding ramp values. For example, for a "light" image, the index values may range from 1-1800, while the ramp values correspondingly range from 1-16,000. As another example, for a "dark" image, the index values may range only from 1-500, while the corresponding ramp values may range from 1-16,000. In certain embodiments, the corresponding ranges for "light" and "dark" images may differ.

In an embodiment, the comparator stage 250 compares the signal from the detector element 210 with reference signal 260. In an embodiment, the comparator stage 250 outputs 270 an index value. Thus, the comparator stage 250 may be viewed as an analog-to-digital converter, for example.

In current systems, the index value is output 270 from the comparator stage 250 to a lookup table (not shown) to get a corresponding pixel value. The lookup table contains an entry for each index value and a corresponding pixel value associated with each index value. In an embodiment of the present invention, such a lookup table is not part of the readout electronics 220. Rather, the lookup table (or other data structure and/or translation mechanism) is part of and/or included in an image processing component. In an embodiment, the lookup table (or other data structure/translation mechanism) contains different mappings for an index value for a "light" image and for index values for a "dark" image. That is, the lookup table may map an index value to a different pixel value when the index value corresponds to a "light" image versus a "dark" image.

Figure 4:
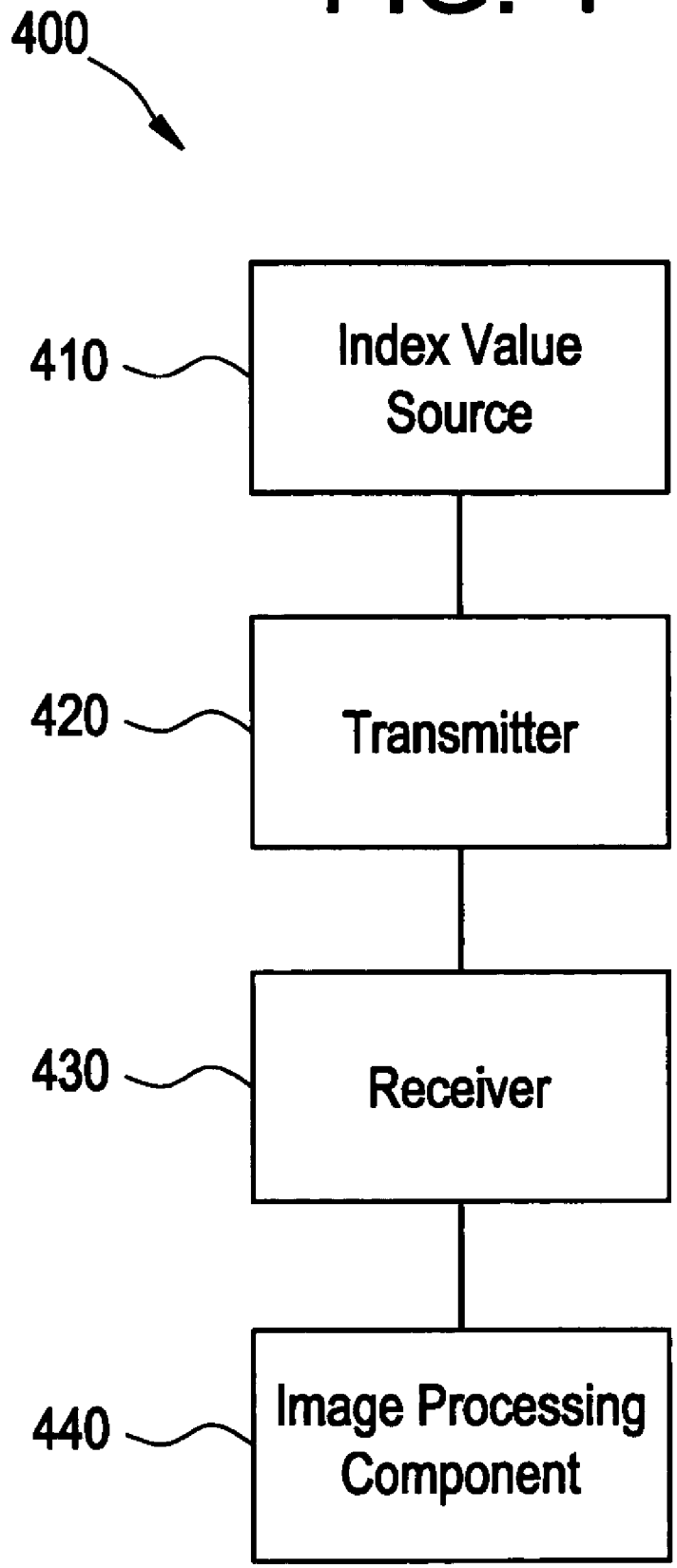
FIG. 4 illustrates an imaging system used in accordance with an embodiment of the present invention.

FIG. 4 illustrates an imaging system 400 used in accordance with an embodiment of the present invention. The system 400 includes an index value source 410, a transmitter 420, a receiver 430, and an image processing component 440. The transmitter 420 is in communication with the index value source 410. The receiver 430 is in communication with the transmitter 420. The image processing component 440 is in communication with the receiver 430. The components of the imaging system 400 may be implemented in hardware, software, and/or firmware, for example. The components of the imaging system 400 may be implemented separately and/or combined in various forms, for example.

The index value source 410 is capable of generating an index value. The index value source 410 may be similar to and/or include the detector 130, readout electronics 139, and/or the comparator stage 250, described above, for example.

The image processing component 440 may include a lookup table. The image processing component 440 is capable of generating a pixel value based at least in part on an index value. The image processing component 440 may be similar to the image processing component 140, described above, for example.

In operation, the index value source 410 generates an index value. The index value may, as described above, be used to generate a reference signal to convert a detector signal to a digital value.

The transmitter 420 may communicate the index value from the index value source 410 to the receiver 430. The transmitter 420 may communicate the index value to the receiver 430, for example, wirelessly. As another example, the transmitter 420 may communicate to the receiver 430 over a cable, infrared, and/or other communication medium, for example.

The receiver 430 may communicate the index value received from the transmitter 420 to the image processing component 440. The receiver 430 may be included in the same physical and/or logic device as the image processing component 440.

The image processing component 440 may receive an index value from the index value source 410 through the transmitter 420 and receiver 430. The image processing component 440 may include a translation mechanism. The translation mechanism may be a lookup table and/or equation, for example. The lookup table may include a mapping from an index value to a pixel value, for example. The equation may take an index value as a parameter and compute a pixel value to return. The pixel value generated by the image processing component 440 may relate to energy detected by a detector element in an imaging system.

In an embodiment, the pixel value has a bit-width greater than the bit-width of the index value. For example, the index value may be represented by 11-bits. The 11-bits may represent the index value as an integer, for example. The pixel value may be represented by a 16-bit value. The pixel value may represent a grayscale level or RGB color value for a given pixel in a digital image, for example.

In an embodiment, the index value source 410 is an analog-to-digital converter. For example, the index value source 410 may include and/or utilize a comparator similar to the comparator stage 250, described above, to perform the analog-to-digital conversion. The comparator may output an index value based at least in part on the detector signal, for example.

In an embodiment, the index value source 410 generates an index value using a ramp. That is, the index value source 410 may generate an index value based at least in part on a ramp. For example, a programmable ramp may be used by a comparator to determine an index value corresponding to a given detector signal. The ramp may be similar to a ramp used as an input to the comparator stage 250, described above, for example. The ramp may be similar to the ramp 300, described above, for example.

In an embodiment, the receiver 430 is in wireless communication with the transmitter 420. For example, a wireless Ethernet transmitter may be used to communicate the index value to a wireless Ethernet receiver.

In an embodiment, the image processing component 440 receives an index value generated by the index value source 410. For example, the index value source 410 may generate an index signal and then communicate the index signal to the transmitter 420. The transmitter 420 may then communicate the index signal to the receiver 430. The image processing component 440 may then receive the index value generated by the index value source 410 from the receiver 430.

Figure 5:
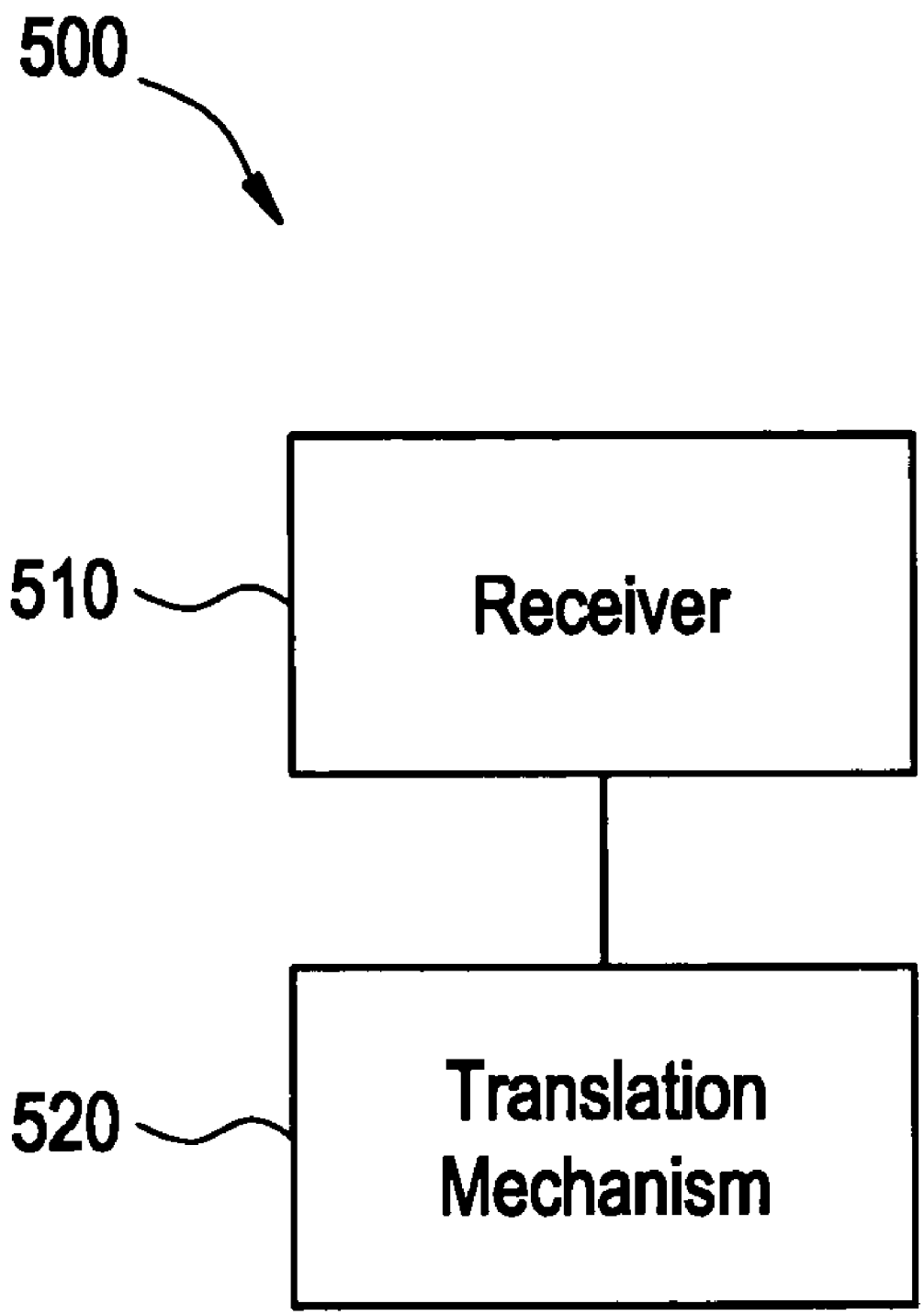
FIG. 5 illustrates a system for reducing image transfer time used in accordance with an embodiment of the present invention.

FIG. 5 illustrates a system 500 for reducing image transfer time used in accordance with an embodiment of the present invention. The system 500 includes a receiver 510 and a translation mechanism 520. The translation mechanism 520 is in communication with the receiver 510. The components of the system 500 may be implemented in hardware, software, and/or firmware, for example. The components of the system 500 may be implemented separately and/or combined in various forms, for example.

The receiver 510 is capable of receiving an index signal from a detector. The detector may be similar to the detectors 130, 200, described above. The receiver 510 is utilized by an image processing component. The image processing component may be similar to the image processing components 140, 440, described above. The translation mechanism 520 is capable of producing and/or generating a pixel value based at least in part on an index signal.

In operation, the receiver 510 receives an index signal from a detector. The index signal is received by the translation mechanism 520 from the receiver 510. The translation mechanism 520 generates and/or produces a pixel value based at least in part on the index signal. The pixel value may represent, for example, the x-ray intensity at a detector element in the detector. The pixel value may be used by the image processing component, for example, to construct a digital image.

The translation mechanism 520 may utilize a lookup table, for example, to generate the pixel value. As another example, the translation mechanism 520 may utilize an equation to produce a pixel value from the index value. The lookup table may contain, for example, as described above, entries for one or more index values and corresponding pixel values for a given index value. The equation may take as a parameter the index value and use the index value to calculate a pixel value.

In an embodiment, the receiver 510 is capable of wirelessly receiving the index value from the detector. For example, the receiver may receive the index value over a wireless Ethernet communication with the detector.

In an embodiment, the translation mechanism 520 includes a lookup table. In an embodiment, the translation mechanism generates the pixel value based at least in part on the index signal and the lookup table. In an embodiment, the image processing component utilizes the translation mechanism 520 to produce a pixel value. In an embodiment, the lookup table includes a mapping between an index signal and a pixel value. In an embodiment, the translation mechanism 520 includes an equation to generate a pixel value based at least in part on the index signal.

In an embodiment, the index signal is based at least in part on a detector signal. For example, the index signal may be output by an index value source in the detector. The index value source may be similar to the index value source 410, described above, for example. The index value source may be in communication with a detector element, for example. The detector element may be similar to detector elements 131, 210, described above, for example. In an embodiment, the index signal is based at least in part on comparing a detector signal to a ramp. The ramp may be similar to the programmable ramp used as a reference input 260, described above, for example.

Figure 6:
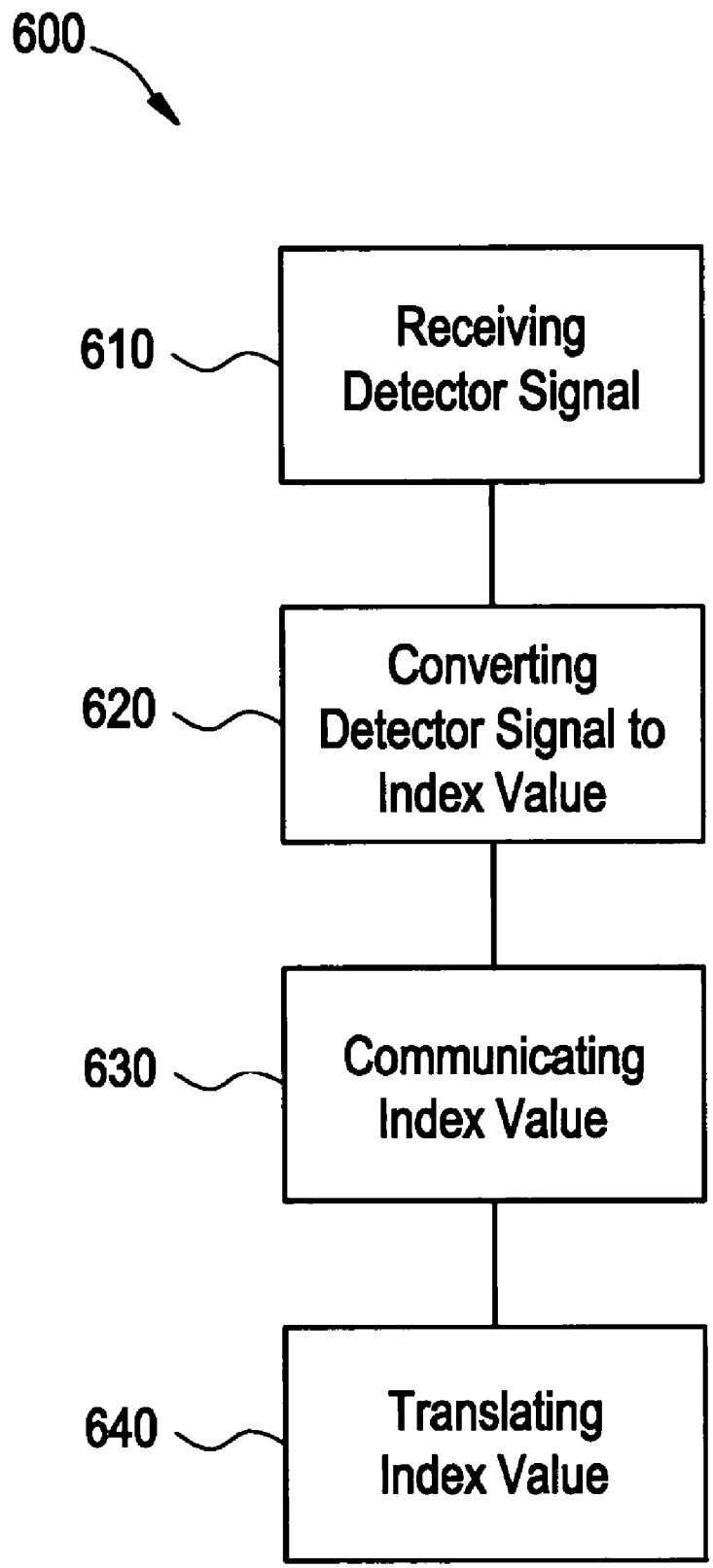
FIG. 6 illustrates a flow diagram for a method for reducing image transfer time in an imaging system in accordance with an embodiment of the present invention.

FIG. 6 illustrates a flow diagram for a method 600 for reducing image transfer time in an imaging system in accordance with an embodiment of the present invention. The method 600 includes the following steps, which will be described below in more detail. First, at step 610, a detector signal is received. Then, at step 620, the detector signal is converted to an index value. Next, at step 630, the index value is communicated to an image processing component. At step 640, the index value is translated to a pixel value. The method 600 is described with reference to elements of systems described above, but it should be understood that other implementations are possible.

First, at step 610, a detector signal is received. The detector signal may be received from a detector element. The detector element may be similar to detector elements 131, 210, described above, for example. The detector element may be included in and/or utilized by an imaging system detector. For example, the imaging system detector may be similar to the imaging system detector 130, described above. The detector signal may represent, in part, the intensity of, for example, x-rays absorbed at that element of the detector.

Then, at step 620, the detector signal is converted to an index value. The detector signal may be converted, in part, by readout electronics. The readout electronics may be similar to the readout electronics 139, 220, described above, for example. The index value may, in part, be a digital representation of the detector signal. For example, the detector signal may be a voltage representing the intensity of x-rays absorbed at a detector element and the index value may be a digital value that represents the detector signal. It should be noted that, as described above, the index value may not be an exact analog-to-digital conversion of the detector signal. The index value may represent the index to a ramp generator that corresponds to the detector value, for example.

Next, at step 630, the index value is communicated to an image processing component. The index value may be communicated from an imaging system detector, for example. The index value may be wirelessly communicated or the index value may be communicated over a cable. The index value may be transmitted by a transmitter, such as transmitter 420, described above. The index value may be received by a receiver, such as receivers 430, 510, described above.

At step 640, the index value is translated to a pixel value. The index value is translated to a pixel value at the image processing component. The image processing component may be similar to the image processing components 140, 440, described above, for example. The image processing component may be similar to and/or may include and/or utilize a translation mechanism similar to the translation mechanism 520, described above, for example. The pixel value may be used in a medical image. The pixel value may be, for example, a 16-bit value that represents the intensity of x-rays received at a detector element in an imaging system.

In an embodiment, the communication of the index value to an image processing component utilizes a wireless communication. For example, a wireless Ethernet communication may be used to communicate the index value to the image processing component.

In an embodiment, the conversion of a detector signal to an index value is performed by and/or utilizes, at least in part, an analog-to-digital converter. For example, the conversion may utilize a comparator similar to the comparator stage 250, described above. The comparator may output an index value based at least in part on the detector signal, for example.

In an embodiment, the conversion of a detector signal to an index value is based at least in part on a ramp. For example, a programmable ramp may be used by a comparator to determine an index value corresponding to a given detector signal. The ramp may be similar to a ramp used as an input to the comparator stage 250, described above, for example. The ramp may be similar to the ramp 300, described above.

In an embodiment, the translation of an index value to a pixel value is based at least in part on a lookup table. For example, the image processing component may utilize a lookup table in mapping an index value to a pixel value. For example, the lookup table may be similar to a lookup table utilized by a translation mechanism 520, described above. The lookup table may map, for example, an 11-bit index value to a 16-bit pixel value for use in forming a digital image.

In an embodiment, the translation of an index value to a pixel value is based at least in part on an equation. For example, the image processing component may utilize an equation to compute a pixel value based at least in part on an index value. For example, the equation may be similar to an equation utilized by a translation mechanism 520, described above. In an embodiment, a combination of lookup table and equation may be utilized by the image processing component to translate an index value to a pixel value.

In an embodiment, the pixel value has a bit-width greater than the bit-width of the index value. For example, the index value may be represented by 11-bits. The 11-bits may represent the index value as an integer, for example. The pixel value may be represented by a 16-bit value. The pixel value may represent a grayscale level or RGB color value for a given pixel in a digital image, for example.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments of the present invention provide an efficient approach for reducing image transfer time in wireless portable x-ray detectors.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An imaging system, said system including:
   an index value source, the index value source capable of generating an index value, the index value source part of an imaging system detector, wherein the index value is latched in an analog-to-digital converter when a programmable ramp based on the index value is compared to a detector signal;
   a transmitter, the transmitter in communication with the index value source, the transmitter adapted to transmit the index value;
   a receiver, the receiver in communication with the transmitter, the receiver adapted to receive the index value; and
   an image processing component, the image processing component in communication with the receiver, the image processing component including a lookup table, the image processing component capable of generating a pixel value based at least in part on the index value and the lookup table, wherein the pixel value has a bit-width greater than the index value.

2. The system of claim 1, wherein the receiver is in wireless communication with the transmitter.

3. A system for reducing image transfer time, said system including:
   a receiver, the receiver capable of receiving an index signal from a transmitter in a remote detector, the receiver utilized by an image processing component, wherein the index signal is latched in an analog-to-digital converter when a programmable ramp based on the index signal is compared to a detector signal, wherein the index signal is generated by an index value source in the remote detector;
   a translation mechanism, the translation mechanism in communication with the receiver, the translation mechanism part of the image processing component, the translation mechanism capable of producing a pixel value based at least in part on the index signal, wherein the pixel value has a bit-width greater than the index signal.

4. The system of claim 3, wherein the receiver is capable of wirelessly receiving the index signal from the remote detector.

5. The system of claim 3, wherein the translation mechanism includes a lookup table.

6. The system of claim 5, wherein the translation mechanism generates the pixel value based at least in part on the index signal and the lookup table.

7. The system of claim 5, wherein the lookup table includes a mapping between an index signal and a pixel value.

8. The system of claim 3, wherein the translation mechanism includes an equation.

9. A method for reducing image transfer time in an imaging system, said method including:
   receiving a detector signal from a detector element, the detector element used by an imaging system detector;
   converting the detector signal to an index value at the imaging system detector, wherein the index value is latched in an analog-to-digital converter when a programmable ramp based on the index value is compared to the detector signal;
   communicating the index value to an image processing component; and
   translating the index value to a pixel value at the image processing component, wherein the pixel value has a bit-width greater than the index value.

10. The method of claim 9, wherein the communication step utilizes wireless communication.

11. The method of claim 9, wherein the translating step is based at least in part on a lookup table.

12. The method of claim 9, wherein the translating step is based at least in part on an equation.

* * * * *